(12) United States Patent
Viscito et al.

(10) Patent No.: US 8,064,517 B1
(45) Date of Patent: Nov. 22, 2011

(54) PERCEPTUALLY ADAPTIVE QUANTIZATION PARAMETER SELECTION

(75) Inventors: Eric Viscito, Saratoga, CA (US); Dzung Hoang, Austin, TX (US)

(73) Assignee: Zenverge, Inc., Cupertino, CA (US)

( * ) Notice: Subject to any disclaimer, the term of this patent is extended or adjusted under 35 U.S.C. 154(b) by 1110 days.

(21) Appl. No.: 11/852,199

(22) Filed: Sep. 7, 2007

(51) Int. Cl.
*H04N 11/02* (2006.01)
*G06K 9/46* (2006.01)
*H04N 7/12* (2006.01)

(52) U.S. Cl. .................. 375/240.03; 382/239; 382/252

(58) Field of Classification Search ............. 375/240.03; 382/239, 252
See application file for complete search history.

(56) References Cited

U.S. PATENT DOCUMENTS

| | | | |
|---|---|---|---|
| 5,231,484 A | 7/1993 | Gonzales et al. | |
| 5,301,242 A | 4/1994 | Gonzales et al. | |
| 6,782,135 B1 | 8/2004 | Viscito et al. | |
| 7,826,533 B2 * | 11/2010 | Hsieh et al. | ............. 375/240.24 |

OTHER PUBLICATIONS

Ning, Liao et al. "Enhanced Fast Mode Decision Based on Edge Map and Motion Detail Analysis for H.264/JVT", 2005 IEEE.*
Chung, T.-Y. et al., "Quantization Control for Improvement of Image Quality Compatible with MPEG2," IEEE Trans. on Consumer Elect., Nov. 1994, pp. 821-825, vol. 40, No. 4.
Cicalini, G. et al., "Dynamic Psychovisual Bit Allocation for Improved Quality Bit Rate in MPEG-2 Transmission over ATM Links," Electronic Letters, Feb. 1996, pp. 370-371, vol. 32, No. 4.
Jayant, N.S. et al., "Signal Compression Based on Models of Human Perception," Proc. of the IEEE, Oct. 1993, pp. 1385-1422, vol. 81.
Lin, F.-H. et al., "An Optimization of MPEG to Maximize Subjective Quality," Proc. ICIP, Oct. 23-26, 1995, pp. 547-550, vol. 2.
Pan, F. et al., "Fast Mode Decision Algorithm for Intraprediction in H.264/AVC Video Coding," IEEE Transactions on Circuits and Systems for Video Technology, Jul. 2005, pp. 813-822, vol. 15, No. 7.
Puri, A. et al., "Motion-Compensated Video Coding with Adaptive Perceptual Quantization," IEEE Trans. on Circuits and Systems for Video Tech., Dec. 1991, pp. 351-361, vol. 1, No. 4.
Viscito, E. et al., "A Video Compression Algorithm with Adaptive Bit Allocation and Quantization," Visual Communication and Image Processing 1991: Visual Communication, Nov. 11-13, 1991, Boston, MA, pp. 58-72, vol. 1605, No. 1.
Westen, S. et al., "Perceptual Optimization of Image Coding Algorithms," Proc. ICIP, Oct. 23-26, 1995, pp. 69-72, vol. 2.
Yang, X. et al., "Rate Control for Videophone Using Local Perceptual Cues," IEEE Transactions on Circuits and Systems for Video Technology, Apr. 2005, pp. 496-507, vol. 15, No. 4.
Yu, H. et al., "A Perceptual Bit Allocation Scheme for H.264," IEEE, 2005, 4 pages.

* cited by examiner

*Primary Examiner* — Michael Simitoski
(74) *Attorney, Agent, or Firm* — Fenwick & West LLP

(57) ABSTRACT

A system (and a method) are disclosed for adaptively selecting quantization parameter for each region of input video signal to be encoded within a video processing system. The system includes a frame partition module, an edge feature detector, a macroblock adaptive quantization energy (AQEnergy) evaluator and a macroblock adaptive quantization parameter selector. The frame partition module partitions a frame of an input video signal into smaller blocks of pixel data. The edge feature detector generates an edge direction histogram for each block to be encoded. The macroblock AQEnergy evaluator receives the edge direction histogram of the block, calculates the AQEnergy of the block and generates the adaptive quantization score (AQScore) of the macroblock. The macroblock adaptive quantization parameter selector selects an appropriate macroblock quantization parameter corresponding to the macroblock AQScore by a combination of programmable scaling and threshold logic.

27 Claims, 5 Drawing Sheets

PERCEPTUALLY ADAPTIVE QUANTIZATION PARAMETER SELECTION

BACKGROUND

1. Field of Art

The disclosure generally relates to video processing, and more particularly, to adaptively selecting quantization parameters within a video processing system to more efficiently compress video images.

2. Description of the Related Art

Video compression is critical for many multimedia applications available today. For applications such as DVD, digital television broadcasting, satellite television, Internet video streaming, video conferencing, video security, and digital camcorders, limited transmission bandwidth or storage capacity stresses the demand for higher compression ratios. A key component in high-compression video coding system is an operational control of an encoder through predictions, transformations and quantization. To efficiently compress video signals, each transform coefficient of video signal from the transformation process, such as Discrete Cosine Transform (DCT), is further quantized by a quantization parameter that is commonly defined by a quantizer step size. The quantization parameter (QP) regulates how much spatial detail is saved. When QP is very small, almost all that detail is retained.

As QP is increased, some of that detail is aggregated, which drops the bit rate required. However, this process increases distortion and causes some loss of quality. As a goal of video compression system to achieve the best fidelity (or the lowest distortion) given the capacity of transmission channel, subject to the coding rate constraint, an appropriately selected quantization parameter can have an enormous impact on achieving the maximum perceptual quality of the reconstructed video picture for a predetermined target bit rate.

The task of designing a video coding system that produces undetectable errors in the reconstructed video images with minimum transmitted bits is difficult. Selection of QP in conventional video coding systems is statistically based, and often further optimized to find the best quantization step size for each image region to be coded in a rate-distortion sense. However, such a statistical model and optimization is often at an expense of a large amount of memory access and computational complexity.

Another problem of the conventional QP selection is that widely varying content and motion of video signals are often not taken into consideration during QP selection. The perceived distortion in visual content is a very difficult quantity to measure, as the characteristics of human visual system are complex and not well understood. This problem is aggravated in video coding, because addition of the temporal domain relative to still images coding complicates the issue. For example, human viewers are more sensitive to reconstruction errors related to low spatial frequencies, such as slow linear changes in intensity or color, than those related to high frequencies. Furthermore, the visibility of distortion depends to a great extent on video image content. In particular, distortions are often much more disturbing in relatively smooth area of an image than in texture regions with a lot of activities.

Accordingly, there is a need for a system and method that adaptively selects quantization parameter for each image region to be coded so that the perceptual quality of the reconstructed video images is efficiently improved.

SUMMARY

One embodiment of a disclosed system (and method) includes adaptively selecting a quantization parameter (QP) for each macroblock of a video input signal to be encoded based on an adaptive quantization score (AQScore) of the macroblock. Embodiments of the perceptually adaptive quantization parameter selection include an edge feature detector, a macroblock AQEnergy evaluator and a macroblock adaptive QP selector. The edge feature detector generates an edge direction histogram for each block to be encoded. The AQEnergy evaluator receives the edge direction histogram of the block, calculates the AQEnergy of the block and generates the AQScore of the macroblock. The macroblock adaptive QP selector receives the AQScore of the macroblock and selects an appropriate QP for the block such that the perceptual quality of the reconstructed video images is efficiently improved.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of the what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Architectural Overview

Figure 1A:
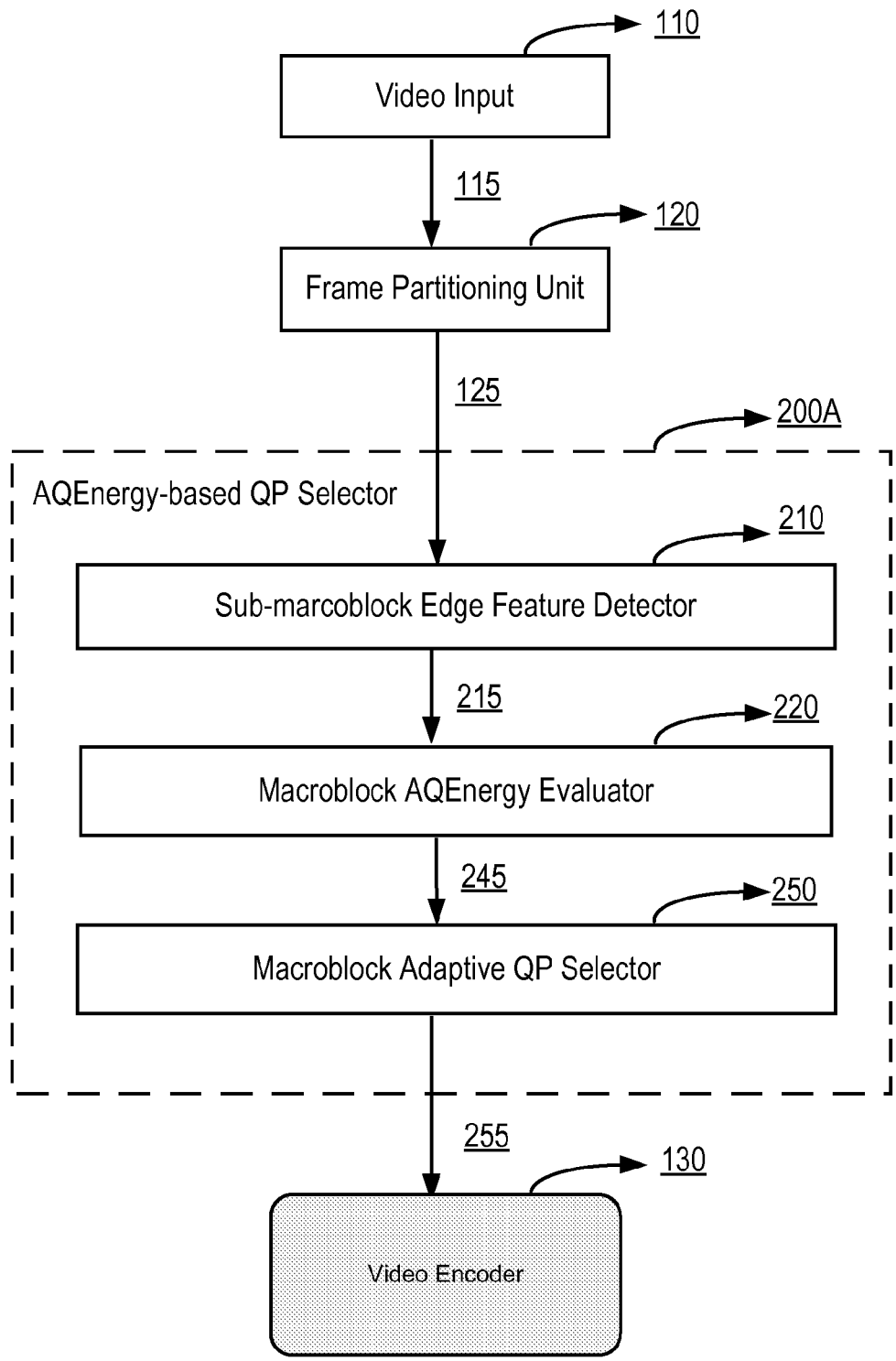
FIG. 1A is a high-level block diagram of an environment having perceptually adaptive quantization parameter selection according to one embodiment.

FIG. 1A is a high-level block diagram of a video processing system 100 having perceptually adaptive quantization parameter (QP) selection according to one embodiment. The video processing system 100 includes a video input 110, such as a sequence of video frames, a frame partitioning unit 120, an adaptive quantization energy (AQEnergy) based QP selector 200A, and a video encoder 130. The AQEnergy-based QP selector 200A includes a sub-macroblock edge feature detector 210, a macroblock AQEnergy evaluator 220 and a macroblock adaptive QP selector 250.

In one embodiment, the video input 110 comprises a sequence of video frames and each video frame includes of blocks of raw video signals/samples in an uncompressed format. The video input 110 may be received from a variety of video sources, such as a television station, a camcorder, a compact disk (CD), a digital versatile disk (DVD), a network, a video database, or a volatile or non-volatile memory. The video input 110 may also include corresponding audio signals. Further, the video input 110 may be received in an analog format and converted to a digital format by an analog-to-digital converter before being processed by the AQEnergy-based QP selector 200A.

The frame partitioning unit 120 receives the video input 110 and partitions each video frame of the video input 110 into a plurality of macroblocks which are blocks of 16×16 luma samples with corresponding chroma samples of the block. Each macroblock is divided into sub-macroblock partitions. In one embodiment, the sub-macroblock partition is a 8×8 partition. In another embodiment, the sub-macroblock partition is a 4×4 partition. Other sub-macroblock partitions, such as 16×8, 8×16, 8×4, 4×8 are possible in other embodiments. For ease of description, reference is made to "block" for "sub-macroblock" for simplicity. For a specific sub-macroblock partition, such as an 8×8 partition, a reference may be made to "8×8 block" to identify it.

In one embodiment, the AQEnergy-based QP selector 200A receives a macroblock (MB) 125 from the frame partitioning unit 120, processes the received macroblock 125 by the sub-macroblock edge feature detector 210, the macroblock AQEnergy evaluator 220 and the macroblock adaptive QP selector 250, and adaptively selects an appropriate QP 255 for the macroblock 125. The video encoder encodes the macroblock 125 with the QP 255 associated with the macroblock 125.

In response to the received macroblock 125 from the frame partitioning unit 120, the sub-macroblock edge feature detector 210 detects possible edges in the video content of the sub-macroblock, and generates an edge direction histogram 215 for each sub-macroblock belonging to the macroblock 125. There are a number of ways to get edge direction information for each sub-macroblock. In one embodiment, the edge detection histogram is generated using Sobel edge operators due to simple computational complexity. In other embodiments, edge direction histograms may be generated by other edge detection algorithms such as edge direction histogram based on local gradients. In one embodiment, the sub-macroblock partition is a 4×4 block. For each 4×4 luma block, a total of nine edge directions are detected by the sub-macroblock edge feature detector 210. The strength of a particular direction is represented by a bin value in the edge direction histogram.

Figure 1B:
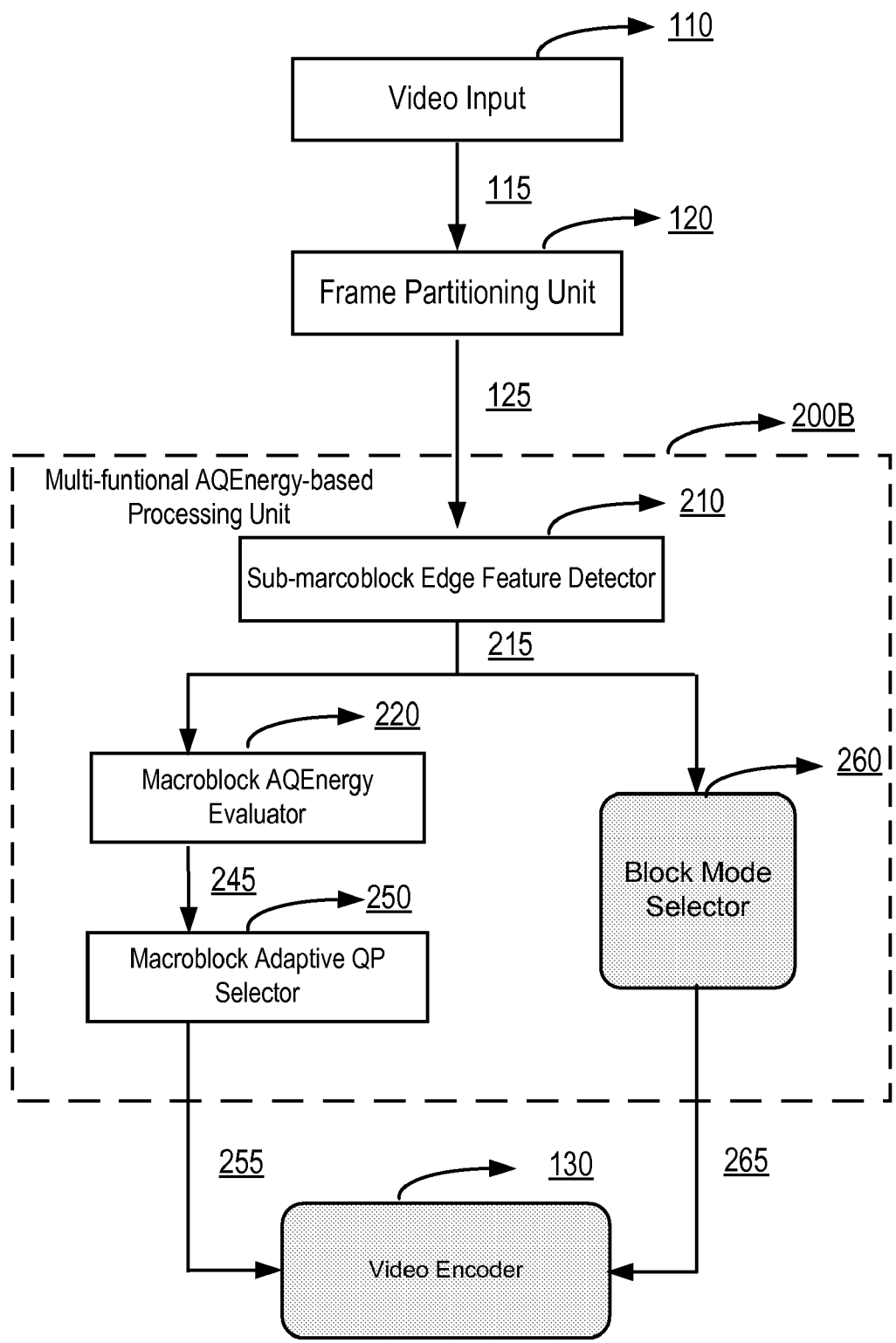
FIG. 1B is a high-level block diagram of a video processing system having an integrated circuit for perceptually adaptive quantization parameter selection and prediction mode selection according to one embodiment.

FIG. 1B is a high-level block diagram of a video processing system 100 having a multi-functional AQEnergy-based processing unit 200B according to one embodiment. The video processing system 100 includes a video input 110, such as a sequence of video frames, a frame partitioning unit 120, a multi-functional AQEnergy-based processing unit 200B, and a video encoder 130. The multi-functional AQEnergy-based processing unit 200B includes a sub-macroblock edge feature detector 210, a macroblock AQEnergy evaluator 220, a macroblock adaptive QP selector 250, and a block mode selector 260.

In one embodiment, the video input 110 comprises a sequence of video frames and each video frame includes of blocks of raw video signals/samples in an uncompressed format. The video input 110 may be received from a variety of video sources, such as a television station, a camcorder, a CD, a DVD, a network, a video database, or a volatile or non-volatile memory. The video input 110 may also include corresponding audio signals. Further, the video input 110 may be received in an analog format and converted to a digital format by an analog-to-digital converter before being processed by the multi-functional AQEnergy-based processing unit 200B.

The frame partitioning unit 120 receives the video input 110 and partitions each video frame of the video input 110 into a plurality of macroblocks which are blocks of 16×16 luma samples with corresponding chroma samples of the block. Each macroblock is divided into sub-macroblock partitions. In one embodiment, the sub-macroblock partition is an 8×8 partition. In another embodiment, the sub-macroblock partition is a 4×4 partition. Other sub-macroblock partitions, such as 16×8, 8×16, 8×4, 4×8 are possible in other embodiments. For ease of description, reference is made to "block" for "sub-macroblock" for simplicity. For a specific sub-macroblock partition, such as an 8×8 partition, a reference may be made to "8×8 block" to identify it.

In one embodiment, the multi-functional AQEnergy-based processing unit 200B receives a macroblock 125 from the frame partitioning unit 120, and processes the received macroblock 125 by the sub-macroblock edge feature detector 210. The edge direction histogram 215 generated by the sub-macroblock edge feature detector 210 is concurrently processed by the macroblock AQEnergy evaluator 220 and the macroblock adaptive QP selector 250 in one path, and by the block mode selector 260 in another path. The macroblock adaptive QP selector 250 adaptively selects an appropriate QP 255 for the macroblock 125, and the block mode selector 260 selects the best coding mode for the macroblock. The video encoder encodes the macroblock 125 with the QP 255 and the coding mode 265 associated with the macroblock 125.

In response to the received macroblock 125 from the frame partitioning unit 120, the sub-macroblock edge feature detector 210 detects possible edges in the video content of the sub-macroblock, and generates an edge direction histogram 215 for each sub-macroblock belonging to the macroblock 125. There are a number of ways to get edge direction information for each sub-macroblock. In one embodiment, the edge detection histogram is generated using Sobel edge operators due to simple computational complexity. In other embodiments, edge direction histograms may be generated by other edge detection algorithms such as edge direction histogram based on local gradients. In one embodiment, the sub-macroblock partition is a 4×4 block. For each 4×4 luma block, a total of nine edge directions are detected by the sub-macroblock edge feature detector 210. The strength of a particular direction is represented by a bin value in the edge direction histogram.

In one embodiment, the block mode selector 260 is used in the H.264 coding environment to optimize the H.264 mode selection process for a macroblock during intraprediction. In another embodiment, the block mode selector 260 is integrated with a macroblock AQEnergy evaluator 220 and a macroblock adaptive QP selector 250 in a chip set in other video coding environment such as MPEG2.

To achieve high coding efficiency, the H.264 Joint Model (JM) reference encoder uses a technique called Lagrangian rate-distortion optimization (RDO) technique to decide the coding mode for a macroblock during intraprediction. However, in order to choose the best coding mode for a macroblock, the JM H.264 encoder calculates the rate-distortion cost of every possible mode and chooses the mode having the minimum value. This process may create a heavy computation burden on the entire encoding process. In one embodiment, this computationally expensive process described above can be optimized by the block mode selector 260 that only chooses a small number of predictions modes for the RDO calculation based on the edge direction histograms of the macroblock. In another embodiment, the block mode selector 260 directly chooses a prediction mode for coding without use of the RDO technique.

Adaptive Quantization Parameter (QP) Selection

Figure 2:
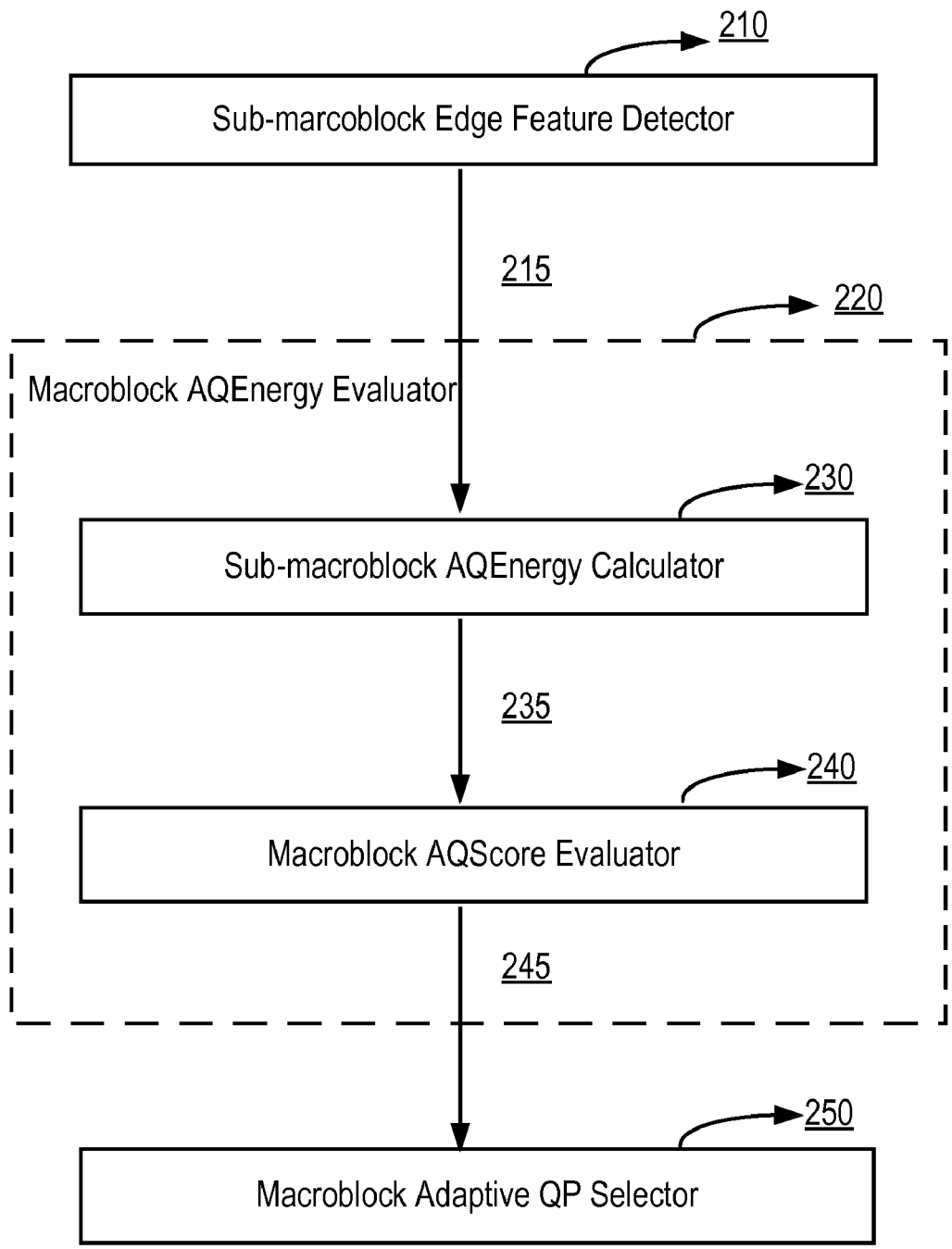
FIG. 2 is a block diagram illustrating modules within a macroblock AQEnergy evaluator according to one embodiment.
Figure 3:
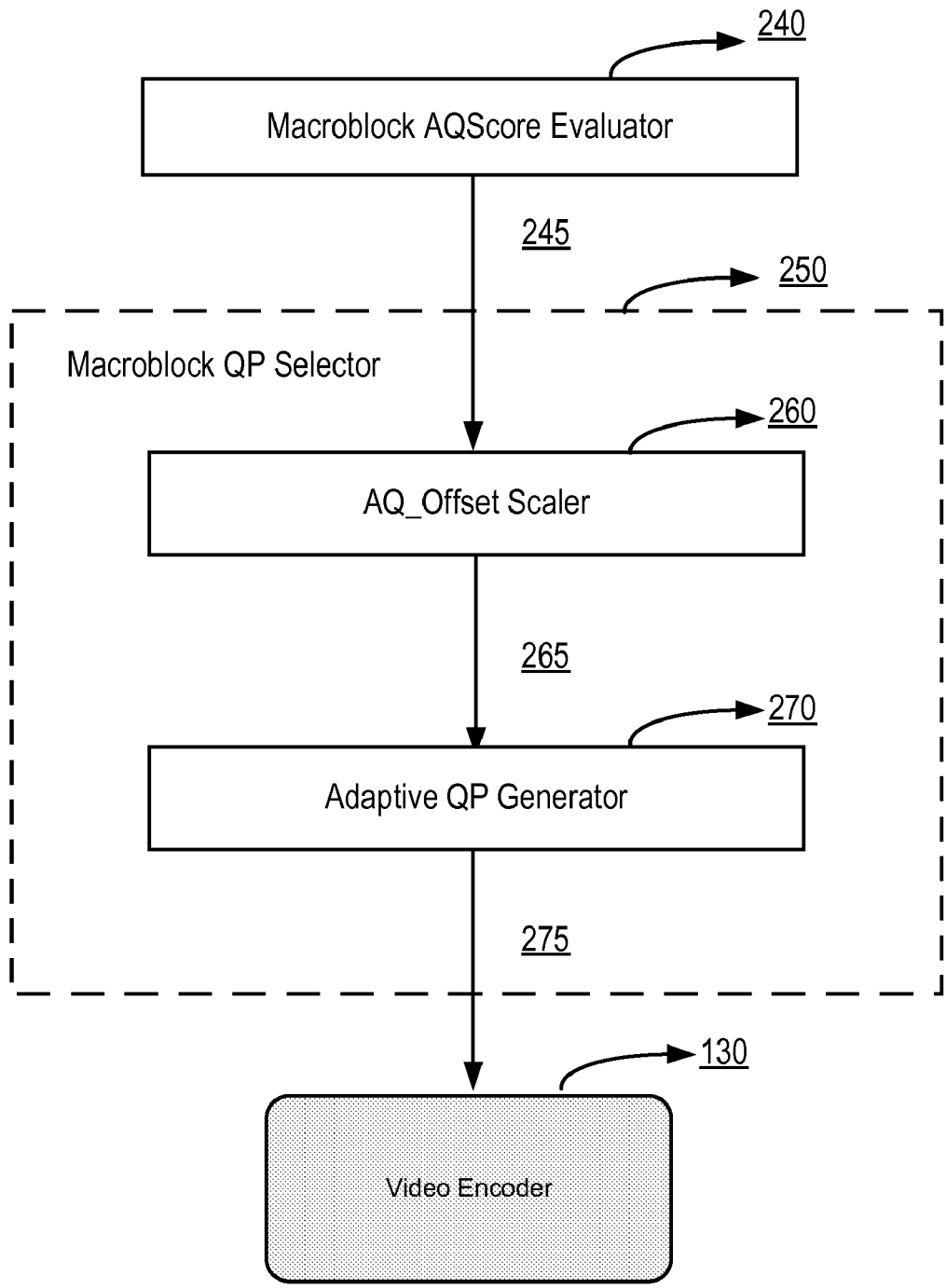
FIG. 3 is a block diagram of a macroblock adaptive QP selector according to one embodiment.
Figure 4:
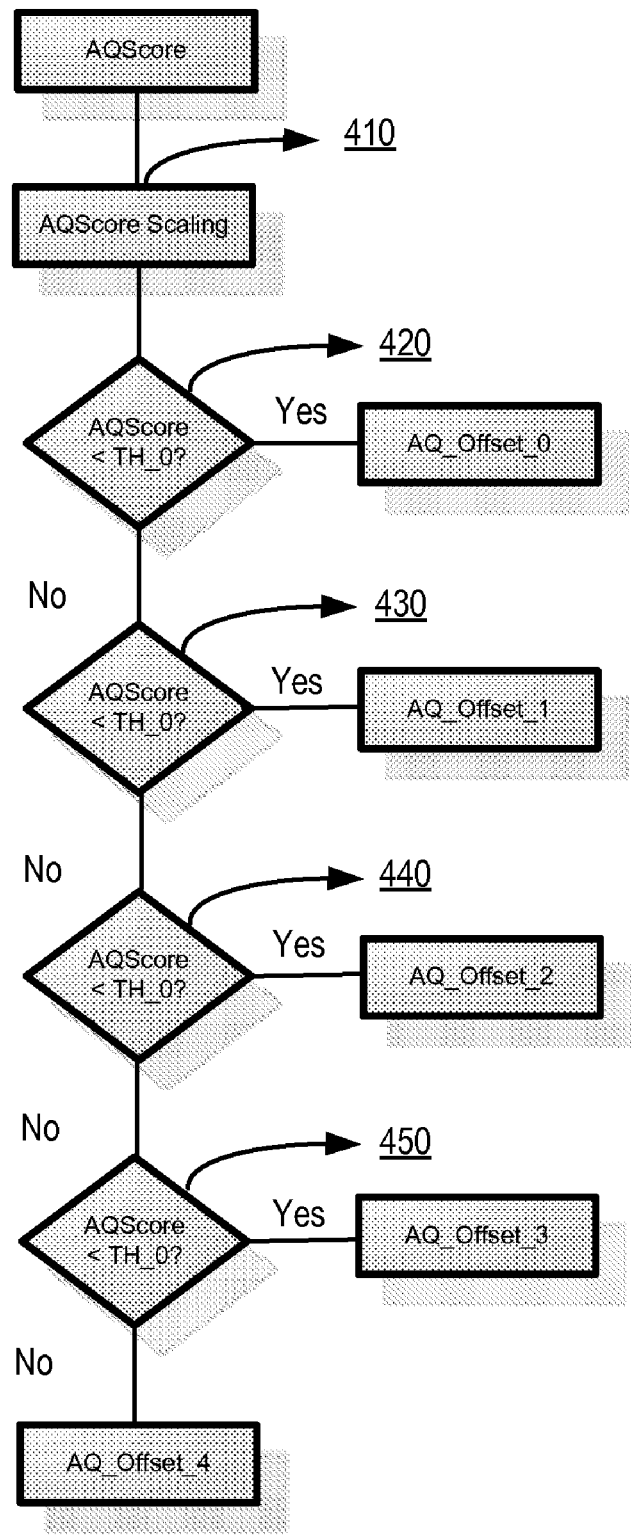
FIG. 4 is a flow chart of a macroblock adaptive QP offset determination according to one embodiment.

FIGS. 2 through 4 illustrate an adaptive QP selection mechanism according to one embodiment. Referring to FIG. 2, it is a block diagram illustrating modules within the macroblock AQEnergy evaluator 220 according to one embodiment. The macroblock AQEnergy evaluator 220 includes a sub-macroblock AQEnergy calculator 230, a macroblock AQScore evaluator 240. In response to the edge direction histogram 215 for each sub-macroblock of a macroblock, the sub-macroblock AQEnergy calculator 230 calculates an AQEnergy 235 of the sub-macroblock. The macroblock AQScore evaluator 240 receives the AQEnergy 235 of the sub-macroblock being processed and calculates the macroblock AQScore 245 over all the sub-macroblocks belonging to the macroblock. The AQScore 245 associated with the macroblock being processed is sent to the macroblock adaptive QP selector 250 for further processing.

In one embodiment, the sub-macroblock partition is a 4×4 partition and the edge direction histogram of the sub-macroblock has multiple directional bin values. Each histogram bin value represents the edge strength for a particular edge direction. In receiving an edge direction histogram of a 4×4 block being processed, the sub-macroblock AQEnergy calculator 230 calculates the AQEnergy 235 of the 4×4 block using the equation (1) below:

$$AQEnergy(blk) = \sum_{n=0}^{N} E_n - E_{max1} - E_{max2} \quad (1)$$

where blk is the sub-macroblock to be evaluated, n represents an edge direction; N is the total number of edge directions; $E_n$ is the edge histogram bin value at direction n;

$$\sum_{n=0}^{N} E_n$$

is the total AQEnergy of the block of all edge directions; $E_{max1}$ is the largest edge histogram bin value among N edge directions, and $E_{max2}$ is the second largest edge histogram bin value among N edge directions.

In response to the AQEnergy 235 of all the 4×4 blocks being processed for the current macroblock, the macroblock AQScore evaluator 240 computes the AQScore 245 of the macroblock. The macroblock AQScore evaluator 240 computes the macroblock AQScore 245 as the minimum AQEnergy 235 over all the sixteen 4×4 blocks belonging to the macroblock being evaluated.

Adaptive Quantization Selection

The visibility of quantization distortion depends to a great extent on video image content. In particular, distortions are often much more disturbing in relatively smooth area of an image or along a sharp edge than in texture regions with a lot of activities. Flat macroblocks generally do not have strong edge content and thus, have low AQScores. A macroblock that contains strong edges may have the AQEnergy concentrated in one or two directions and may also have a low AQScore. In contrast, a texture macroblock with undirected textures may have the AQEnergy in many directions, and consequently, a high AQScore.

One embodiment uses the common practice in video coding standards, such as MPEG2, MPEG4 and H.264, etc., to handle the initial QP sent to the encoder along with the input video sequence. That is, the initial QP is provided as an encoding parameter sent to the encoder along with the input video sequence. Thus, a macroblock with flat areas or sharp edges needs a finer quantization, i.e., smaller QP value, to preserve the smoothness or sharp edges in the video content. A macroblock with high texture may be quantized more since the quantization artifacts may be hidden in the texture. In one embodiment, a macroblock with complex texture is identified based on the macroblock AQScore 245, and an appropriate QP is generated by adjusting the initial QP based on the macroblock AQScore 245.

FIG. 3 is a block diagram of macroblock adaptive QP selector according to one embodiment. The macroblock adaptive QP selector 250 includes an AQ_Offset scaler 260 and an adaptive QP generator 270. The AQ_Offset scaler 260 receives the macroblock AQScore 245, calculates an AQ_Offset 265 for the macroblock, and sends the AQ_Offset 265 to the adaptive QP generator 270. The adaptive QP generator 270 generates an appropriate QP 275 for the macroblock by adding the AQ_Offset to the initial QP, and sends the QP to the video encoder 130 for further processing.

In one embodiment, the AQ_Offset scaler 260 receives the macroblock AQScore 245, and calculates the AQ_Offset 265 by a combination of programmable scaling and threshold logic. The programmable scaling may be a programmable right shift by a selected scale. The programmable right shifting allows the range of AQScore 245 to be scaled before thresholding. The threshold values used in the threshold logic may be determined empirically by trial-and-error on a set of training video sequences. The programmable scaling may be absorbed in terms of threshold levels. For example, scaling AQ_Score 245 by ½, i.e. right shifting of 1, is equivalent to doubling the threshold values. The combination of programmable scaling and threshold logic allows the AQ_Offset values 265 to be adjustable to yield best quality on a set of training video sequences. The training may be repeated as needed. In another embodiment, the AQ_Offset values may be manipulated by a rate controller to effect a change in the bit rate.

To calculate the AQ_Offset 265 by the AQ_Offset scaler 260, the AQ_Offset scaler 260 compares the received AQScore 245 with a predetermined AQScore marker. If the AQScore 245 is large than a predetermined AQScore marker, the AQ_Offset scaler 260 adjusts the AQScore 245 by decreasing the AQScore 245 using right shifting by a scale. In one embodiment, a right shift scale may take on a value from a set of scales of 0, 1, 2, and 3. The obtained AQScore is further adjusted through the threshold logic. The AQScore scaler 260 compares the AQScore 245 with a set of predetermined AQ_threshold values, and sets the appropriate AQ_Offset 265. In one embodiment, the AQ_threshold value ranges from 0 to 31 and the AQ_Offset may take a value from 0 to 15.

To illustrate the AQ_Offset generation describe above, FIG. 4 is a flow chart of AQ_Offset generation using four AQ_threshold values and the corresponding AQ_Offset values. The AQ_Offset scaler 260 receives the macroblock AQScore 245 from the macroblock AQEnergy evaluator 240, and adjusts 410 the AQScore by a scaling value, i.e., 0 to 3. The AQ_Offset scaler 260 compares 420 the AQScore 245 with TH0. If the scaled AQScore is smaller than threshold value 0 (TH0), the AQ_Offset is set to AQ_Offset0. Otherwise, the scaled AQScore is compared 430 with threshold value 1 (TH1), if it is smaller than the TH1, the AQ_Offset is set to AQ_Offset1. The AQ_Offset scaler repeats the above steps, i.e., 440 to 450, until an appropriate AQ_Offset value is generated.

The disclosed embodiments beneficially allow for a system and method that adaptively selects quantization parameter for each image region to be coded so that the perceptual quality of the reconstructed video images is efficiently improved. The embodiments analyze the energy contained in each macroblock using edge direction histogram and an AQEnergy evaluator. Macroblocks with different video content are differentiated based on the AQScores associated with the macroblocks. For example, a macroblock with complex texture is identified based on the macroblock AQScore, and an appropriate QP is generated by increasing the initial QP by scaling upward and fine tuning the QP using thresholding. Consequently, the smoothness of the macroblocks with flat areas and the sharpness of the strong edges in the macroblocks are preserved using appropriate QPs, and the quantization artifacts due to greater quantization for the macroblocks with high textures are hidden within the textures.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations (e.g. the processes described above), while described functionally, computationally, or logically, are understood to be implemented by computer programs or equivalent electrical circuits, microcode, or the like. The computer programs are typically embedded as instructions that can be stored on a computer readable memory (e.g. flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for adaptively selecting quantization parameter for each image region to be coded so that the perceptual quality of the reconstructed video images is efficiently improved through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for adaptively selecting quantization parameters within a video processing system, comprising:

receiving an input video signal from one or more of a plurality of input video sources;

partitioning a frame of an input video signal into smaller blocks of pixel data;

receiving an edge direction histogram of a block;

calculating an adaptive quantization energy (AQEnergy) of a block using the edge direction histogram of the block;

calculating a macroblock adaptive quantization energy score (AQScore) using the AQEnergy of a plurality of blocks, wherein each block is associated with the MB; and selecting a quantization parameter for a macroblock by a combination of programmable scaling and threshold logic in response to the calculated AQScore of the macroblock.

2. The method of claim 1, wherein receiving an edge histogram of a block includes obtaining each histogram bin value that represents the edge strength for a particular edge direction.

3. The method of claim 1, wherein AQEnergy of a block comprises:

$$AQEnergy(blk) = \sum_{n=0}^{N} E_n - E_{max1} - E_{max2}$$

where blk is the block to be evaluated, n represents an edge direction; N is the total number of edge directions; $E_n$ is the edge histogram bin value at direction n;

$$\sum_{n=0}^{N} E_n$$

is the total AQEnergy of the block of all edge directions; $E_{max1}$ is the largest edge histogram bin value among N edge directions, and $E_{max2}$ is the second largest edge histogram bin value among N edge directions.

4. The method of claim 1, wherein the AQScore of a macroblock is the minimum AQEnergy evaluated over all the blocks, each block associated with the macroblock.

5. The method of claim 1, wherein selecting a quantization parameter for a macroblock comprises calculating a macroblock adaptive quantization offset (AQ_Offset) in response to the received AQScore of the macroblock.

6. The method of claim 5, wherein the AQ_Offset calculation comprises scaling the received macroblock AQScore by a scale to generate a scaled AQScore.

7. The method of claim 6, where the scale of the macroblock AQScore scaling is a value from a set of scale values, including 0, 1, 2, and 3.

8. The method of claim 5, wherein AQ_Offset calculation further comprises adjusting the scaled AQScore by a threshold logic.

9. The method of claim 8, wherein adjusting the scaled AQScore by a threshold logic comprises comparing the scaled AQScore with a set of threshold values.

10. The method of claim 9, wherein the set of threshold values ranges from 0 to 31 inclusive.

11. The method of claim 8, wherein adjusting the scaled AQScore by a threshold logic further comprises setting the AQ_Offset in response to the comparison result of the scaled AQScore with a set of threshold values.

12. The method of claim 11, wherein the AQ_Offset ranges from 0 to 15 inclusive.

13. The method of claim 1, wherein selecting a quantization parameter for a macroblock comprises generating an appropriate macroblock quantization parameter by adding the macroblock AQ_Offset in response to a received initial macroblock quantization parameter.

14. A system for adaptively selecting quantization parameters within a video processing system, comprising:
 a frame partitioning unit configured to partition a frame of input video signal into smaller blocks of pixel data;
 a block edge feature detector configured to generate an edge direction histogram of a block;
 a macroblock AQEnergy evaluator configured to calculate an adaptive quantization energy of a block using the edge direction histogram of the block, and to calculate a macroblock adaptive quantization energy score (AQScore) using the AQEnergy of a plurality of blocks, wherein each block is associated with the macroblock; and
 a macroblock adaptive quantization parameter selector configured to select a quantization parameter for a macroblock by a combination of programmable scaling and threshold logic using the calculated AQScore of the macroblock.

15. The system of claim 14, wherein each histogram bin value of the edge direction histogram of a block represents the edge strength for a particular edge direction.

16. The system of claim 14, wherein the macroblock AQEnergy evaluator is configured to calculate the AQEnergy of a block by the following formula:

$$AQEnergy(blk) = \sum_{n=0}^{N} E_n - E_{max1} - E_{max2}$$

wherein blk is the block to be evaluated, n represents an edge direction, N is the total number of edge directions, $E_n$ is the edge histogram bin value at n direction, $$\sum_{n=0}^{N} E_n$$

is the total AQEnergy of the block of all edge directions, $E_{max1}$ is the largest edge histogram bin value among N edge directions, and $E_{max2}$ is the second largest edge histogram bin value among N edge directions.

17. The system of claim 14, wherein the AQScore of a macroblock is the minimum AQEnergy evaluated over all the blocks, each block associated with the macroblock.

18. The system of claim 14, wherein the macroblock adaptive quantization parameter selector is configured to select a quantization parameter for a macroblock by calculating a macroblock adaptive quantization offset (AQ_Offset) in response to the received AQScore of the macroblock.

19. The system of claim 18, wherein the macroblock adaptive quantization parameter selector is configured to calculate the AQ_Offset by scaling the received macroblock AQScore by a scale to generate a scaled AQScore.

20. The system of claim 19, where the scale of the macroblock AQScore scaling is a value from a set of scale values, including 0, 1, 2, and 3.

21. The system of claim 18, wherein the macroblock adaptive quantization parameter selector is further configured to calculate the AQ_Offset by adjusting the scaled AQScore by a threshold logic.

22. The system of claim 21, wherein the macroblock adaptive quantization parameter selector is configured to compare the scaled AQScore with a set of threshold.

23. The system of claim 22, wherein the set of threshold values ranges from 0 to 31 inclusive.

24. The system of claim 21, wherein the macroblock adaptive quantization parameter selector is further configured to set the AQ_Offset in response to the comparison result of the scaled AQScore with a set of threshold values.

25. The system of claim 24, wherein the AQ_Offset ranges from 0 to 15 inclusive.

26. The system of claim 14, wherein the macroblock adaptive quantization parameter selector is further configured to generate an appropriate macroblock quantization parameter by adding the macroblock AQ_Offset in response to a received initial macroblock quantization parameter.

27. A non-transitory computer readable storage medium structured to store instructions, the instructions when executed by a processor cause the processor to:
- receive an input video signal from one or more of a plurality of input video sources;
- partition a frame of an input video signal into smaller blocks of pixel data;
- receive an edge direction histogram of a block;
- calculate an adaptive quantization energy (AQEnergy) of a block using the edge direction histogram of the block;
- calculate a macroblock adaptive quantization energy score (AQScore) using the AQEnergy of a plurality of blocks, wherein each block is associated with the MB; and
- select a quantization parameter for a macroblock by a combination of programmable scaling and threshold logic in response to the calculated AQScore of the macroblock.

* * * * *